United States Patent
Villafuerte et al.

(10) Patent No.: US 11,372,846 B2
(45) Date of Patent: Jun. 28, 2022

(54) GENERATING AND UTILIZING PRE-ALLOCATED STORAGE SPACE

(71) Applicant: INTERNATIONAL BUSINESS MACHINES CORPORATION, Armonk, NY (US)

(72) Inventors: Frances Hwa Villafuerte, San Jose, CA (US); Hong Mei Zhang, Beijing (CN); Xiaobo Wang, Beijing (CN); Shuo Li, Beijing (CN); Sheng Yan Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

(21) Appl. No.: 16/932,080

(22) Filed: Jul. 17, 2020

(65) Prior Publication Data

US 2022/0019574 A1    Jan. 20, 2022

(51) Int. Cl.
*G06F 16/23*    (2019.01)
*G06F 16/28*    (2019.01)

(52) U.S. Cl.
CPC ........ *G06F 16/2379* (2019.01); *G06F 16/285* (2019.01)

(58) Field of Classification Search
USPC ....................................................... 707/703
See application file for complete search history.

(56) References Cited

U.S. PATENT DOCUMENTS

| 8,204,912 | B2 | 6/2012 | Bamford et al. | |
| 9,037,622 | B1* | 5/2015 | Rubio | G06F 12/0223 |
| | | | | 707/899 |
| 9,576,004 | B1* | 2/2017 | Li | G06F 16/285 |
| 10,067,849 | B2 | 9/2018 | Deng et al. | |
| 10,509,667 | B1* | 12/2019 | Popuri | G06F 9/45558 |
| 2007/0168640 | A1 | 7/2007 | Hrle et al. | |
| 2008/0222221 | A1* | 9/2008 | Gukal | G06F 16/2272 |
| 2010/0257092 | A1* | 10/2010 | Einhorn | G06Q 40/025 |
| | | | | 705/38 |

(Continued)

OTHER PUBLICATIONS

Mell et al., "The NIST Definition of Cloud Computing", NIST, Special Publication 800-145, Sep. 2011, 7 pages.

*Primary Examiner* — Cam Linh T Nguyen
(74) *Attorney, Agent, or Firm* — Robert Shatto; Andrew D. Wright; Roberts Calderon Safran & Cole, P.C.

(57) ABSTRACT

Systems and methods for pre-allocating and utilizing storage space in a relational database are provided. In embodiments a method includes: obtaining transaction data including data regarding record insertions in a relational database, wherein each record of the record insertions is associated with a key value; identifying a type of each of the record insertions as either a random insertion type or a key range insertion type based on the database transaction data, wherein the random insertion type comprises records associated with respective key values inserted in a random order, and the key range insert type comprises records associated with a range of key values inserted within a certain time period; predicting a new range of key values associated with future record insertions based on the type of each of the record insertions; and pre-allocating page space in one or more pages of the relational database for the future record insertions.

20 Claims, 15 Drawing Sheets

(56) References Cited

U.S. PATENT DOCUMENTS

| | | |
|---|---|---|
| 2012/0054159 A1 | 3/2012 | Xu et al. |
| 2015/0100606 A1* | 4/2015 | Bonner ............... G06F 16/1727 |
| | | 707/803 |
| 2016/0171022 A1 | 6/2016 | Konik et al. |
| 2018/0121517 A1* | 5/2018 | Barsness ............. G06F 11/3409 |
| 2019/0179613 A1 | 6/2019 | Stamos et al. |
| 2021/0132829 A1* | 5/2021 | Zhao .................... G06F 3/0614 |

* cited by examiner

- ■ Keys 100- 150
- ☐ Keys 150- 200
- ▩ Keys 200- 250

Keys between 200 and 220 are inserted in a time slot

200, 215, 210 ,208,
220,209,207,202,
201,216,203,218,
204,219,217,205
206,214,211,212
213

| Page 10 | Page 11 | Page 12 | Page 13 | Page 14 | Page 15 |
|---------|---------|---------|---------|---------|---------|
| 200,215 210,208 | 220,209 207,202 | 201,216 203,218 | 204,219 217,205 | 206,214 211,212 | 213 |

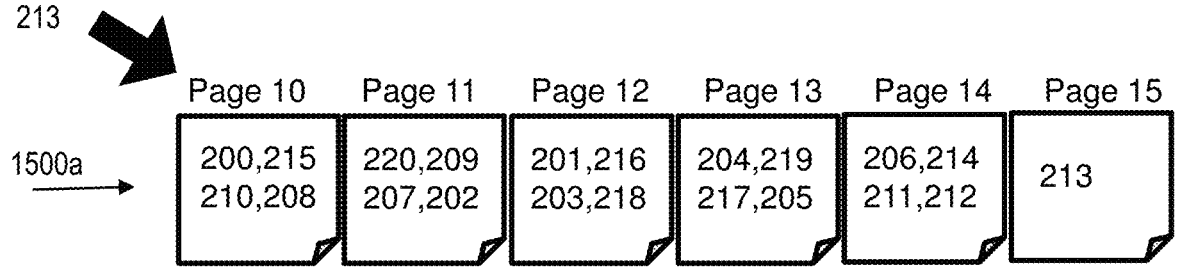
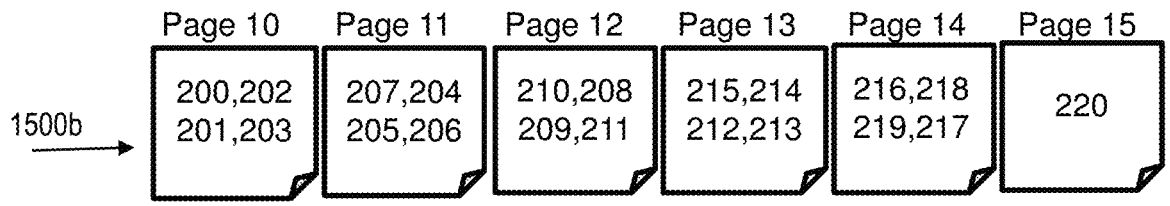
FIG. 15

GENERATING AND UTILIZING PRE-ALLOCATED STORAGE SPACE

BACKGROUND

Aspects of the present disclosure relate generally to relational databases and, more particularly, to generating and utilizing pre-allocated storage space in a relational database.

A relational database is a type of digital database based on a relational model of data, which is managed by a database management system (DBMS). This model organizes data into one or more tables or "relations" of columns (attributes) and rows (data records), with a unique key (e.g., key value) identifying each row. As used herein, the term key refers to an identifier (e.g., a numeric value) used to establish and identify relationships between tables and to uniquely identify any record or row of data inside a table space. Table spaces are the physical objects in which the data is stored in the relational database. A table space contains one or more tables and is typically divided into a plurality of data pages.

Generally, when an application requests a DBMS to insert a data record into a table of a relational database, one or more space map pages that cover the table are accessed to choose a suitable data page for insertion of the data record. Some DBMSs use a clustering index in order to identify a data page into which a data record should be stored. In such cases the DBMS attempts to insert the data record in the data page where adjacent key values already reside. In general, maintaining data records in the clustering key order (numeric order according to key values) enables more efficient data retrieval when the clustering index is used to retrieve a set of data records within a key range.

SUMMARY

In a first aspect of the disclosure, there is a computer-implemented method including: obtaining, by a computing device, database transaction data including data regarding record insertions in a table of a relational database, wherein each record of the record insertions is associated with a key value; identifying, by the computing device, a type of each of the record insertions as either a random insertion type or a key range insertion type based on the database transaction data, wherein the random insertion type comprises records associated with respective key values inserted in a random order, and the key range insert type comprises records associated with a range of key values inserted within a certain time period; predicting, by the computing device, a new range of key values associated with future record insertions based on the type of each of the record insertions; and pre-allocating, by the computing device, page space in one or more pages of the relational database for the future record insertions.

In another aspect of the disclosure, there is a computer program product including one or more computer readable storage media having program instructions collectively stored on the one or more computer readable storage media. The program instructions are executable to: initiate a search for available storage space in a table space of the relational database upon receipt of a request to insert data; determine whether the request to insert data comprises a key range insert type; in response to determining the request comprises a key range insert type, determine if there is an existing page-keys map, wherein the page-keys map associates pre-allocated spaces for future data insertions with page numbers of pages of the pre-allocated spaces; in response to determining there is an existing page-keys map, determine if the page-keys map indicates that a candidate page is available to store the data based on the page-keys map; in response to determining the candidate page is available, determine if there is enough storage space in the candidate page to store the data; and in response to determining there is enough storage pace in the candidate page to store the data, store the data in the candidate page based on the request to insert data.

In another aspect of the disclosure, there is system including a processor, one or more computer readable storage media, and program instructions collectively stored on the one or more computer readable storage media. The program instructions are executable to: obtain database transaction data including data regarding record insertions in a table of a relational database, wherein each of record inserted is associated with a key value; identify a type of each of the record insertions as either a random insertion type or a key range insertion type based on the database transaction data, wherein the random insertion type comprises records associated with respective key values inserted in a random order, and the key range insert type comprises records associated with a range of key values inserted within a certain time period; predict a new range of key values associated with future record insertions based on the type of each of the record insertions; and pre-allocate page space in one or more pages of the relational database for the future record insertions.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 15 is a diagram comparing record insertion results for existing methods versus record insertions results utilizing a page-keys map in accordance with embodiments of the present disclosure.

DETAILED DESCRIPTION

Figure 1:
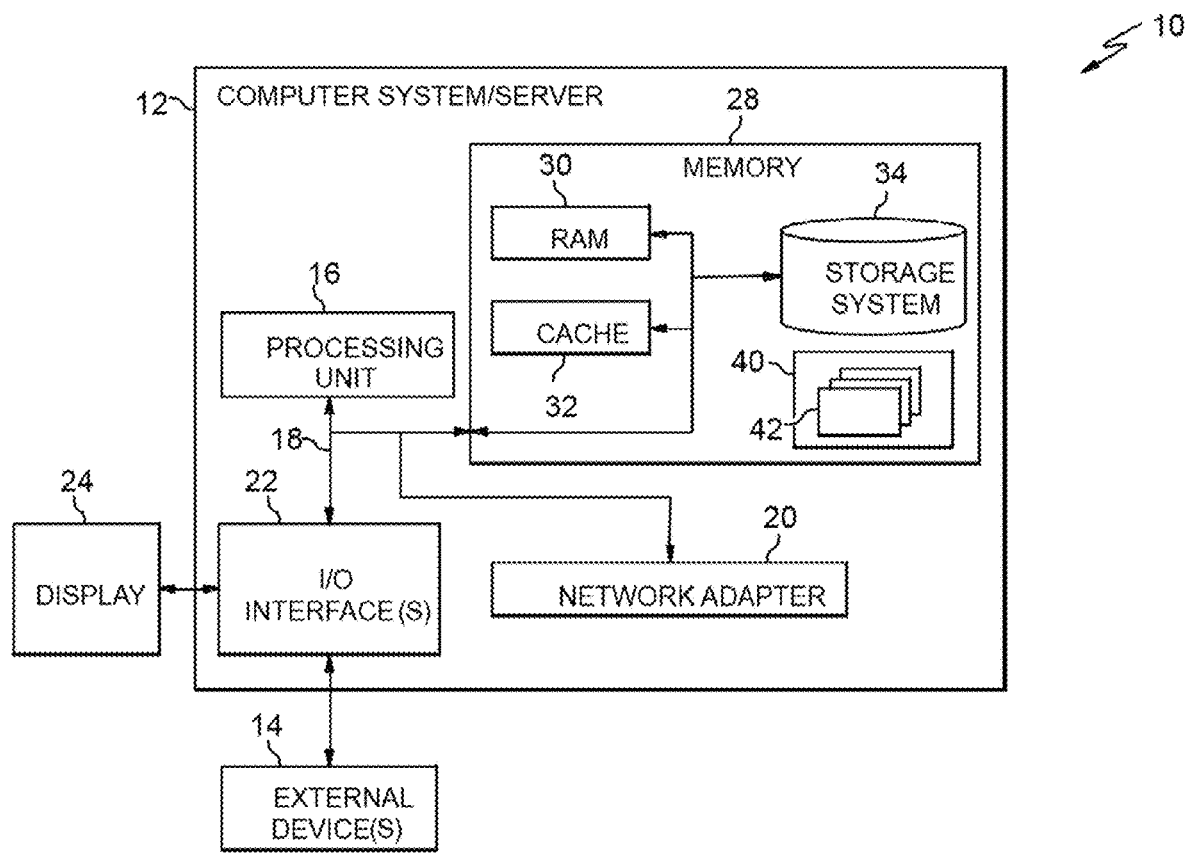
FIG. 1 depicts a cloud computing node according to an embodiment of the present disclosure.

Aspects of the present disclosure relate generally to relational databases and, more particularly, to generating and utilizing pre-allocated storage space in a relational database. In embodiments, a system obtains relational database information (e.g., historic transactions logs, real-time statistics (RTS) data, trace information, etc.) and identifies historic data insertions as being a random insert type or a key range insert type. Aspects of the disclosure predict an insert key range associated with future record insertions and hotspot page blocks (a range of pages associated with a hotspot) using machine learning (ML) based on the identified insertion types. In implementations, the system pre-allocates and formats space in a table space for the anticipated key range insert, skipping identified hot pages when searching for candidate pages to avoid hotspot problems.

The term hotspot as used herein refers to a situation where there are multiple transactions (e.g., data record insert transactions) running concurrently on a range of pages in a relational database, which may cause contention in the range of pages (e.g., competition of lock, competition of input/output on page, etc.). The generation of a hotspot in a database table space can result in a significant degradation in performance of concurrent data inserting. Embodiments of the disclosure constitute improvements in the technical field of database management by providing systems and methods for inserting records in pre-allocated spaces in a database, which may result in improved clustering of inserted records in the database while avoiding the creation of hotspots. Implementations of the disclosure thus can improve the performance and efficiency of a relational database system.

In implementations, a system associates or chains pre-allocated space to predicted hotspot blocks, and directly inserts data records into the pre-allocated space instead of searching for space in a table of a relational database. In embodiments, for a key range record insert type, the system pre-calculates candidate pages in the table space based on cluster order for an anticipated upcoming key range in the pre-allocated space, and builds a page-keys map between key ranges and page numbers and/or rows of the table space, which enables the system to quickly find the candidate page and maintain a high cluster order for inserted records. In implementations, for a normal record insert (not a key range record insert), the system searches a page for free space to put the record while skipping identified hotspots and potential hot pages that have been frequently used and have less page space in order to reduce hotspot problems.

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
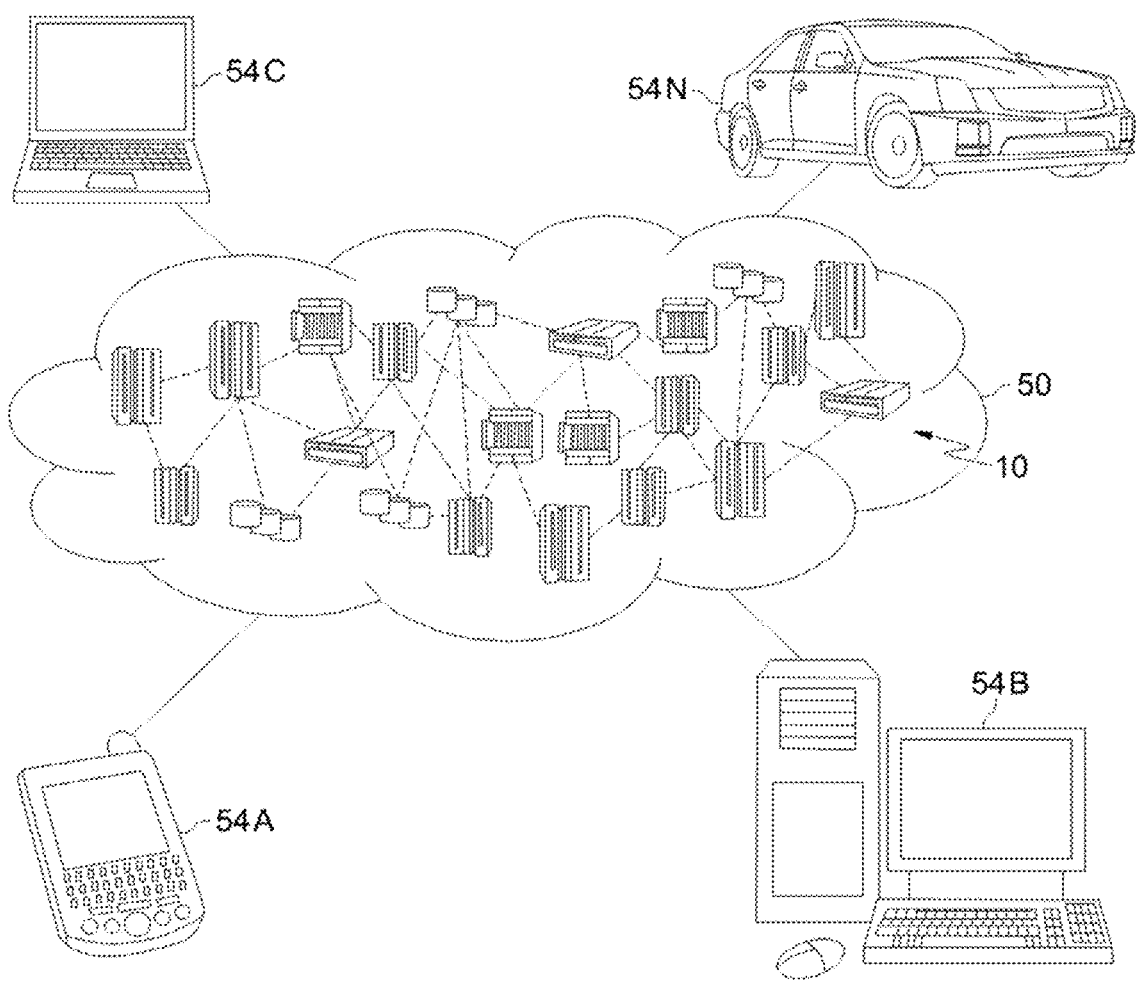
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
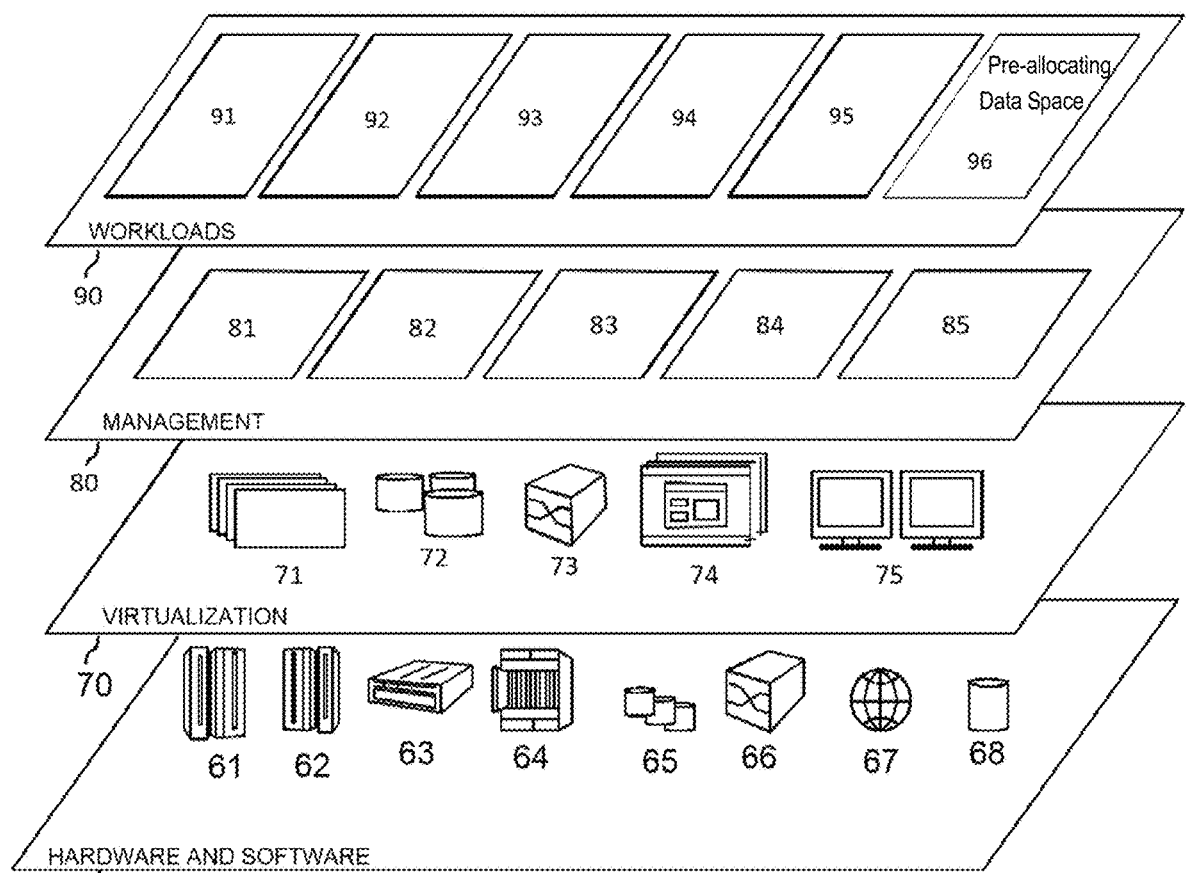
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pre-allocating data space 96.

Implementations of the disclosure may include a computer system/server 12 of FIG. 1 in which one or more of the program modules 42 are configured to perform (or cause the computer system/server 12 to perform) one of more functions of the pre-allocating data space 96 of FIG. 3. For example, the one or more of the program modules 42 may be configured to: obtain transaction data including data regarding record insertions in a relational database, wherein each of the records is associated with a key value; identify a type of each of the record insertions as either a random insertion type or a key range insertion type; predict a new range of key values associated with anticipated future record insertions based on the type of the record insertions; pre-allocate page space in pages of the relational database for the anticipated future record insertions; and generate a page-keys map associating the new range of key values with a respective page number of pages and/or rows of a table space of the relational database.

Figure 4:
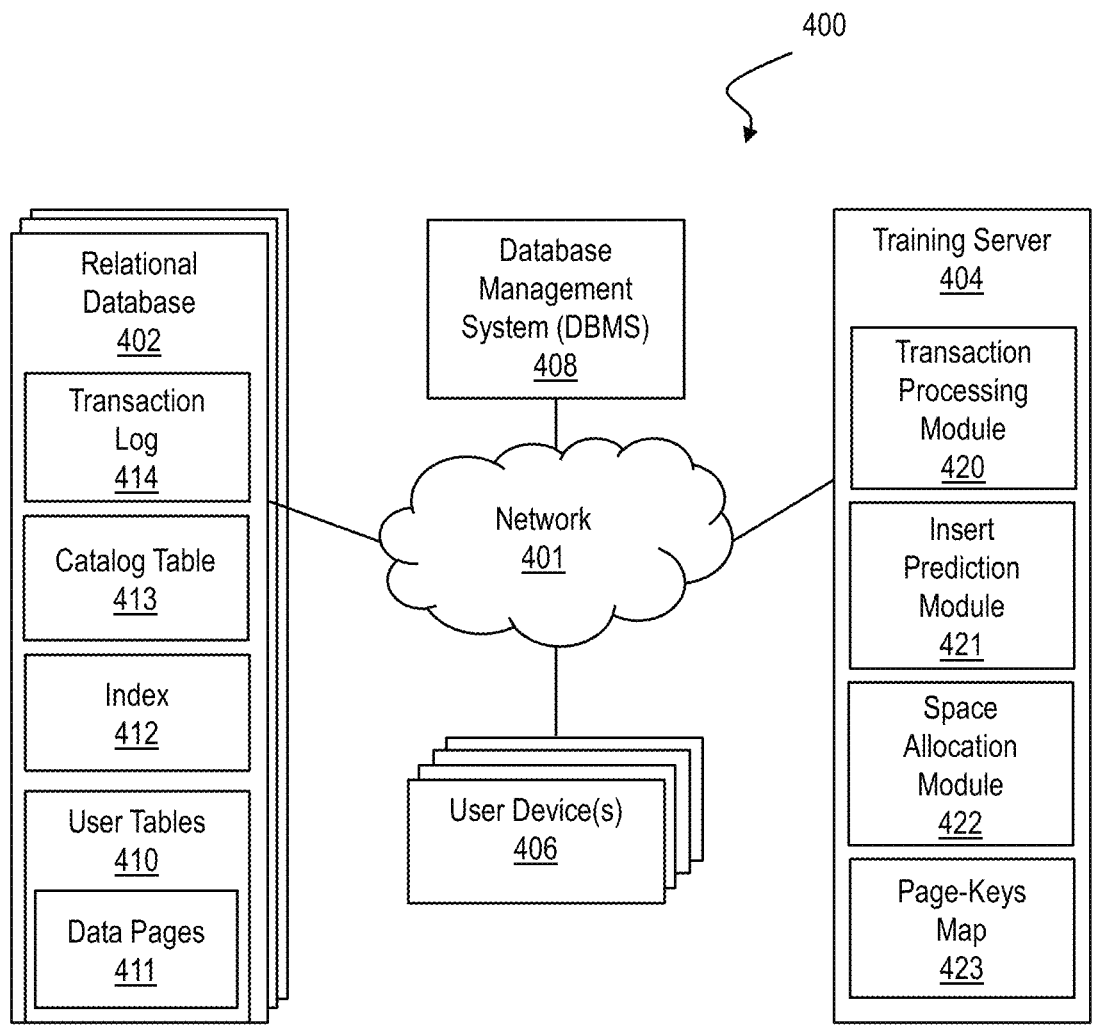
FIG. 4 shows a block diagram of an exemplary environment in accordance with aspects of the disclosure.

FIG. 4 shows a block diagram of an exemplary environment in accordance with aspects of the disclosure. In embodiments, the environment 400 includes network 401 interconnecting one or more relational databases 402 with a training server 404, one or more user devices 406 and a database management system (DBMS) 408. Although shown separately, the DBMS 408 may be part of the relational database 402.

The network 401 may be any suitable communication network or combination of networks, such as a local area network (LAN), a general wide area network (WAN), and/or a public network (e.g., the Internet). In embodiments, the one or more relational databases 402, the training server 404, one or more user devices 406, and/or the DBMS 408 comprise nodes 10 in the cloud computing environment 50 of FIG. 2. In implementations, the training server 404 provides cloud-based services to one or more clients in the environment 400 via the network 401.

The one or more user devices 406 may comprise one or more computing devices (e.g., a personal digital assistant or cellular telephone 54A, desktop computer 54B, laptop computer 54C, etc. of FIG. 2) configured to store data in and/or retrieve data from the one or more relational databases 402, wherein each computing device includes components of the computer system 12 of FIG. 1.

In implementations, the one or more relational databases 402 each comprise one or more components of the computer system 12 of FIG. 1 and are configured to obtain data from one or more of the user devices 406 for storage, and provide data to one or more of the user devices 406 upon request (e.g., via the DBMS 408). In implementations, the relational database 402 is a special purpose computing device providing data storage and retrieval services for clients of the network 401. The relational database 402 may include one or more program modules (e.g., program module 42 of FIG. 1) executed by the relational database 402 and configured to perform one or more functions described herein. In embodiments, the relational database 402 includes one or more of the following program modules (e.g., program modules 42 of FIG. 1): user tables (table space) 410 including data pages 411, an index 412, a catalog table 413, and a transaction log 414.

In embodiments, the user tables 410 comprise tables for organizing data including rows (records) and columns (attributes), wherein a unique key or key value identifies each row in the table. Each table may represent one entity type, such as a product. Each row may represent an instance of an entity type (e.g., a first product) and each column may represent values attributed to that instance (e.g., a product price). Each table may be divided into a plurality of data pages 411, wherein each data page has an associated page number.

In embodiments, the index 412 is a clustering index that includes an order of rows that corresponds to an order of rows in data pages of the user tables 410. In implementations, there is one clustering index per table. In implementations, the index 412 determines how rows are physically ordered (clustered) in a user table 410. When a user table 410 is associated with an index 412, an INSERT statement may cause the DBMS 408 to insert records as nearly as possible in the order of their index values.

In implementations, the catalog table 413 comprises a catalog (data dictionary, system catalog, information schema) that documents database objects and system settings for use by the DBMS 408. In embodiments, the transaction log 414 is configured to record all transactions (e.g., writing data) and database modifications made by each transaction.

With continued reference to FIG. 4, in implementations, the training server 404 comprises one or more components of the computer system 12 of FIG. 1 and is configured to process transaction information from one or more relational databases 402, predict future data record insertions, allocate space for predicted future data record insertions, and generate a page-keys map to relate pre-allocated space to data pages 411 of user tables 410. In implementations, the training server 404 is a special purpose computing device providing services for clients of an organization that owns one or more of the training server 404, relational database 402, and/or DBMS 408. The training server 404 may include one or more program modules (e.g., program module 42 of FIG. 1) executed by the training server 404 and configured to perform one or more functions described herein.

In embodiments, the training server 404 includes one or more of the following program modules (e.g., program modules 42 of FIG. 1): a transaction processing module 420, an insert prediction module 421, a space allocation module 422, and a page-keys map 423. In implementations, the transaction processing module 420 of the training server 404 is configured to obtain historic transactions data from a relational database 402, process the historic transactions data to identify types of data insertions in the user tables 410 of the relational databases 402, and feed the resulting insertion type data to the insert prediction module 421 of the training server 404. In implementations, the transaction processing module 420 is configured to identify whether a data insertion event (entry of a data record) is a key range insert type or a random insert type transaction. The term random insertion type as used herein refers to a type of record insertion wherein records associated with respective key values are inserted into pages of a table randomly. The term key range insertion type as used herein refers to a type of record insertion wherein records associated with a range of key values (key range) are all inserted within pages of a table within a given time period, but not necessarily in key range order.

Still referring to FIG. 4, in implementations, the insert prediction module 421 is configured to utilize machine learning (ML) tools to predict hotspots and upcoming key ranges of future record insertions based on the insert type data generated by the transaction processing module 420, and provide the resulting prediction data to the space allocation module 422 of the training server 404. In embodiments, the space allocation module 422 is configured to process the prediction data to determine hotspots to skip, determine candidate data pages 411 of the user tables 410 for pre-allocation of space, pre-allocate data space for future data insertions to the user tables 410, and provide the pre-allocation data to the relational database 402 and/or DBMS 408.

In implementations, the DBMS 408 of the environment 400 is a database management system configured to provide management and/or analytics tools for transactional workloads (data transactions). One example of a DBMS 408 that may be utilized in conjunction with embodiments of the disclosure is the DB2® database, which is a registered trademark of International Business Machines Corporation. The DBMS 408 may be separate from or part of the relational database 402.

In embodiments, separate modules described above may be integrated into a single module. Additionally, or alternatively, a single module described above may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
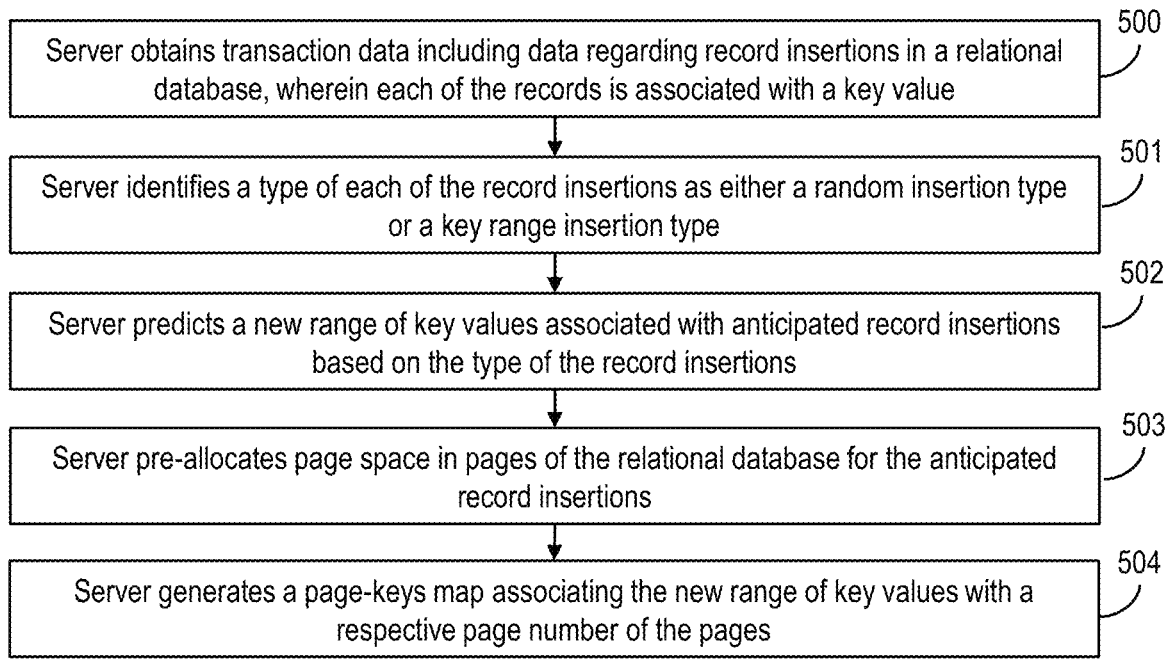
FIG. 5 shows a flowchart of an exemplary method in accordance with aspects of the disclosure.

FIG. 5 shows a flowchart of an exemplary method in accordance with aspects of the present disclosure. Operations of the method may be carried out in the environment of FIG. 4 and are described with reference to elements depicted in FIG. 4.

At operation 500, the training server 404 obtains transaction data including data regarding data insertions of records in the relational database 402, wherein each of the records is associated with a key value (key). In implementations, the training server 404 obtains the transaction data from the relational database 402 continuously or periodically. The transaction data may include page space map information, real-time statistical information, transaction log information, or other information regarding data record insertions into user tables 410 of the relational database 402. In embodiments, the transaction processing module 420 of the training server 404 implements operation 500.

At operation 501, the training server 404 identifies a type of each of the record insertions as either a random insertion type or a key range insertion type. As noted above, the term random insertion type as used herein refers to a type of record insertion wherein records associated with respective key values are inserted into pages of a table randomly. The term key range insertion type as used herein refers to a type of record insertion wherein records associated with a range of key values (key range) are all inserted within pages of a table within a given time period, but not necessarily in order of key value. In embodiments, the transaction processing module 420 of the training server 404 implements operation 501.

At operation 502, the training server 404 predicts a new range of key values associated with anticipated future record insertions based on the type of the record insertions determined at operation 501. In implementations, the training server 404 utilizes ML techniques to implement operation 502. In embodiments, the training server 404 utilizes density-based spatial clustering and autoregressive integrated moving average (ARIMA) techniques to identify existing hotspots, predict future hotspots, and/or predict upcoming key ranges, as discussed in more detail with respect to FIGS. 7 and 9 below. The training server 404 may concurrently detect hotspots in the transaction data and predicts future hotspots based on the transaction data. According to an example embodiment, if during a certain time period, a number of processes waiting for inserting operations reached a predetermined threshold and an average waiting time of processes waiting for inserting operation reached a predetermined threshold, then an occurrence of a hotspot is detected/determined. Similarly, future hotspots may be predicted based on a number of predicted inert operations within a certain time period reaching a predetermined threshold and/or a predicted average waiting time for the predicted inserting operation reaching a predetermined threshold value. In embodiments, the insert prediction module 421 of the training server 404 implements operation 502.

At operation 503, the training server 404 pre-allocates and formats page space in pages of the relational database 402 for the anticipated future record insertions predicted at operation 502. The training server 404 may pre-calculate the candidate page for an anticipated range of keys based on the available row length and page size for the purpose of inserting the key in cluster order in the table space. In implementations, for key range insert type insertions, the training server 404 pre-allocates page blocks for upcoming insertions. In embodiments, for random insert type insertions the training server 404 pre-allocates additional page block space for hotspot page blocks and chains them together. When there are reusable spaces in a table space the training server 404 may reuse these spaces when performing pre-allocation. In embodiments, the space allocation module 422 of the training server 404 implements operation 503.

At operation 504, the training server 404 generates a page-keys map for the pre-allocated and formatted page space of operation 503, wherein the page-keys map associates the new range of key values determined at operation 502 with respective page numbers of pages and/or rows of the pre-allocated page space. In embodiments, the space allocation module 422 of the training server 404 implements operation 504.

Figures 6A, 6B:
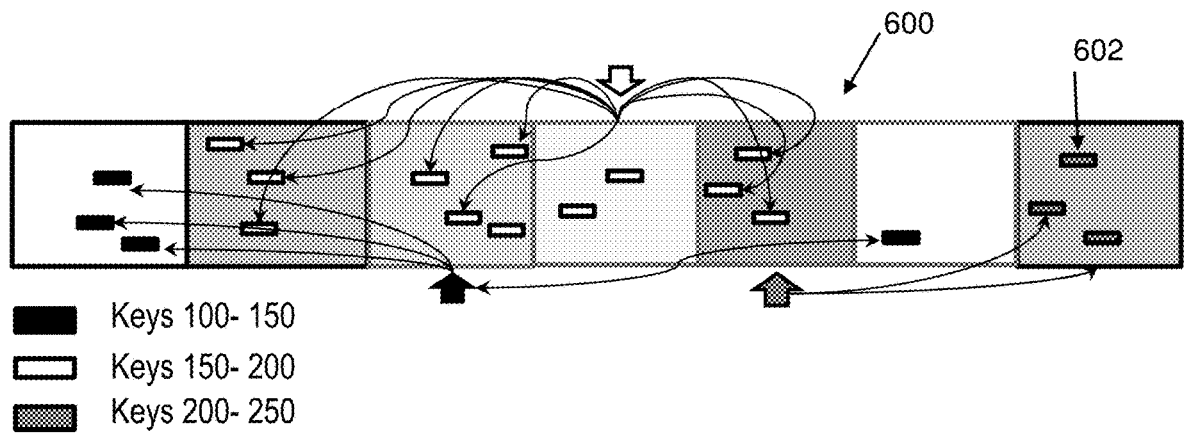
FIG. 6A illustrates an exemplary record insertion scenario utilizing existing insertion methods.
FIG. 6B illustrates keys associated with the data records of FIG. 6A inserted in data pages of a table of a relational database.

FIG. 6A illustrates an exemplary record insertion scenario utilizing existing insertion methods. As depicted in FIG. 6A, table spaces 600 include inserted records (e.g., record 602), each associated with a key falling in one of three key ranges: keys 100-150; keys 150-200, and keys 200-250. In the example of FIG. 6A, records 602 are inserted in table spaces during a certain time period in a manner that results in a poor cluster ratio (e.g., records are not inserted/clustered according to key values/ranges).

FIG. 6B illustrates keys associated with the data records of FIG. 6A inserted in data pages of a table of a relational database. In the example of FIG. 6B, keys between 200 and 220 are inserted in free spaces at a particular time, resulting in a poor cluster ratio for keys in a range. For example, rather than records being clustered in order according to their keys, a record with key 200 is stored on page 10 while the next record with key 201 is stored on page 12, the next record with key 202 is stored on page 11, etc. Existing methods address clustering problems by reorganizing table space, which can be time consuming, or appending data to an end of a table space, which may result in a low cluster ratio.

Figure 7:
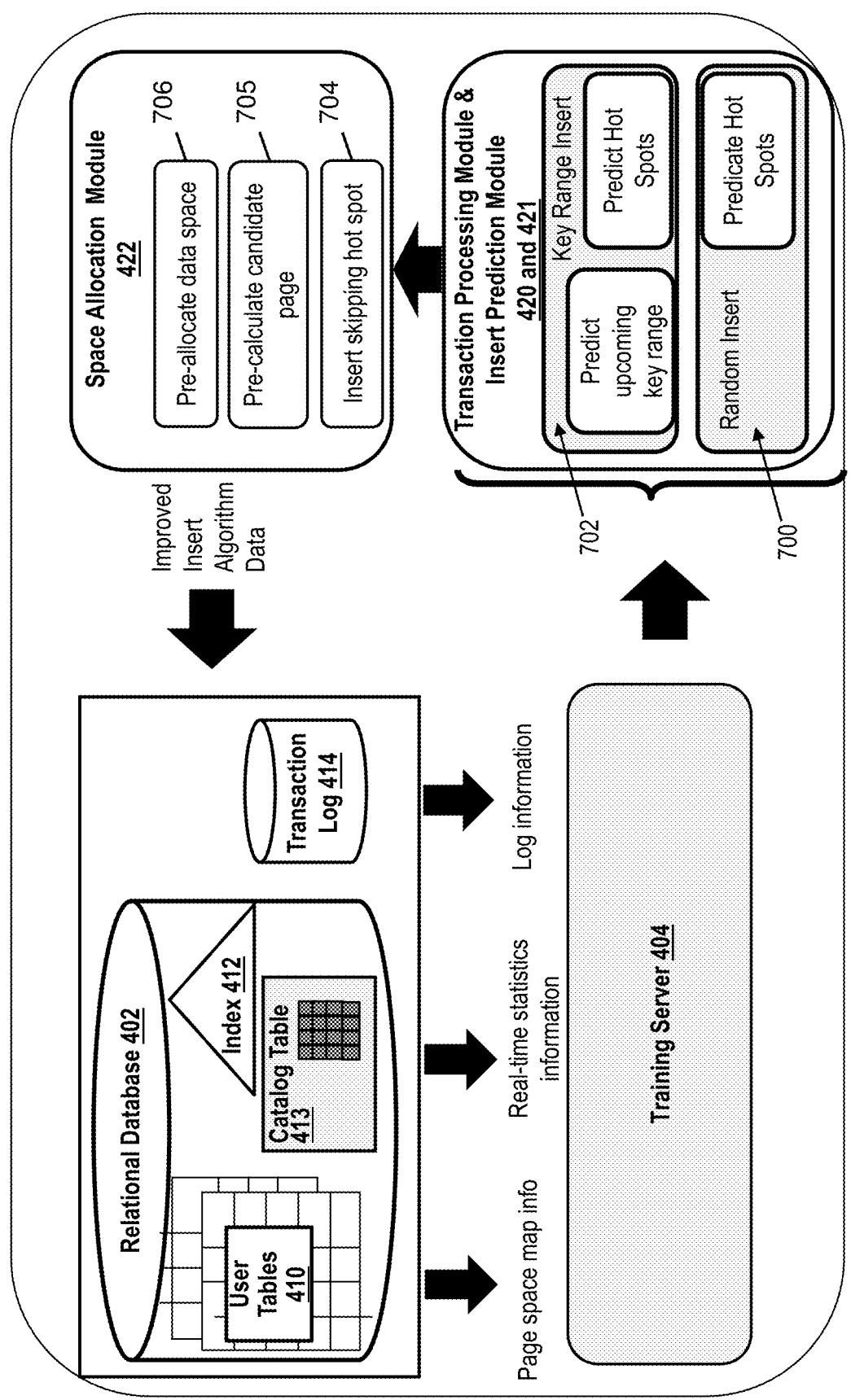
FIG. 7 is an exemplary flow diagram showing system components and functions according to embodiments of the present disclosure.

FIG. 7 is an exemplary flow diagram showing system components and functions according to embodiments of the present disclosure. The functions of FIG. 7 may be carried out in the environment of FIG. 4 according to method operations of FIG. 5, and are described with reference to components depicted in FIG. 4. FIG. 7 illustrates a relational database 402 including user tables 410, an index 412 and a catalog table 413, as well as an associated transaction log 414. The training server 404 obtains transaction data including data regarding record insertions in a relational database, wherein each of the records is associated with a key value, and provides the transaction data to the transaction processing module 420.

Figure 8:
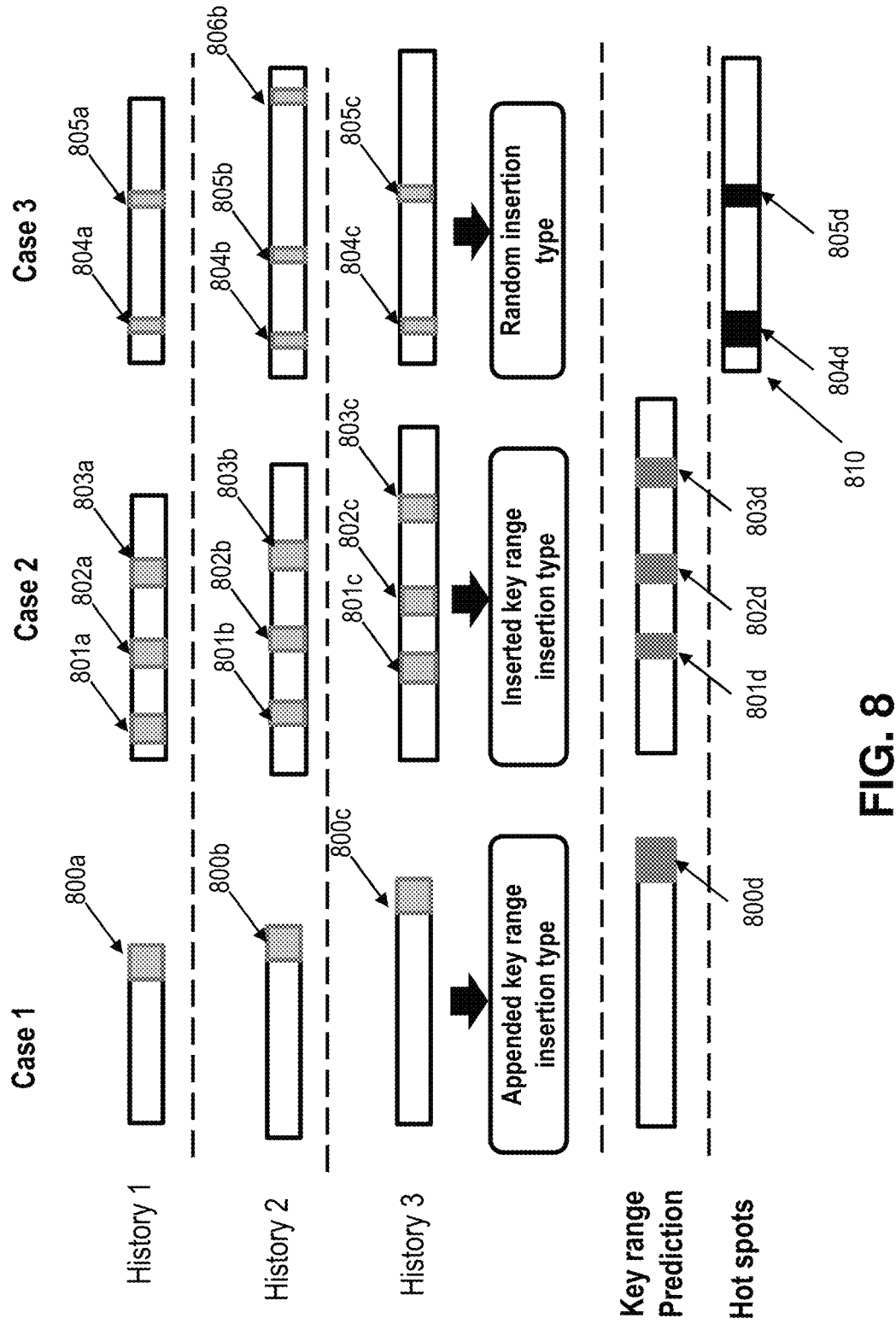
FIG. 8 is a diagram illustrating the classification of types of historic record insertions and associated predicted key ranges and hotspots according to embodiments of the disclosure.

The transaction processing modules 420 process the transaction data to determine a type of each of the record insertions (e.g., either a random insertion type 700 or a key range insertion type 702). Based on prior transactions of the random insertion type, the insert prediction module 421 predicts hotspots and an upcoming range of key values associated with anticipated future record insertions based on historic insertions of the key range insert type 702. See, for example, the use of a ML algorithm for predicting key ranges in FIG. 9. The insert prediction module 421 also predicts hotspots based on historic transaction data regarding the historic insertions of the random insertion type 700. See FIG. 8 illustrating predicting hotspots based on historic transactions. The prediction data is fed to the space allocation module 422, and the space allocation module 422 identifies hotspots to skip at 704, pre-calculates candidate pages based on the anticipated future record insertion at 705, and pre-allocates data space in the candidate pages to accommodate the anticipated future record insertions at 706. See, for example, the anticipated future record insertions 804*d* and 805*d* in FIG. 8. The insert prediction module 421 may also generate a page-keys map associating page numbers of the pre-allocated space with the upcoming range of key values. Information generated by the training server 404 (e.g., where such information includes improved insert algorithm data) is provided to the relational database 402 for use in future record insertion events. The relational database 402 may utilize the information generated by the training server 404 to improve its record insertion algorithm (e.g., see the insertion algorithm of FIG. 13), resulting in a higher ratio of stored clustered records according to key values.

FIG. 8 is a diagram illustrating the classification of types of historic record insertions and predicted key ranges and hotspots according to embodiments of the disclosure. FIG. 8 depicts a first set of database transaction data labeled "History 1", a second set of database transaction data labeled "History 2" and a third set of database transaction data labeled "History 3". For each set of data there are three types of data insertion transactions, including a first case wherein records 800*a*-800*c* associated with a key range are appended as an ordered group to an end of a page (appended key range insertion type) at a certain time period; a second case wherein records 801*a*-801*c*, 802*a*-802*c* and 803*a*-803*c* associated with a key range are inserted at a certain time period (inserted key range insertion type), and a third case wherein records 804*a*-804*a*-804*c*, 805*a*-805*c* and 806*b* having associated key values are randomly inserted over time (random insert type). In accordance with embodiments of the disclosure, the insert prediction module 421 of FIG. 4 predicts new key ranges associated with the anticipated insertion of records 800*d*, 801*d*-803*d* for each of the three cases, and predicts hotspots 810 based on anticipated future record insertions 804*d* and 805*d* within pages of the database.

Figure 9:
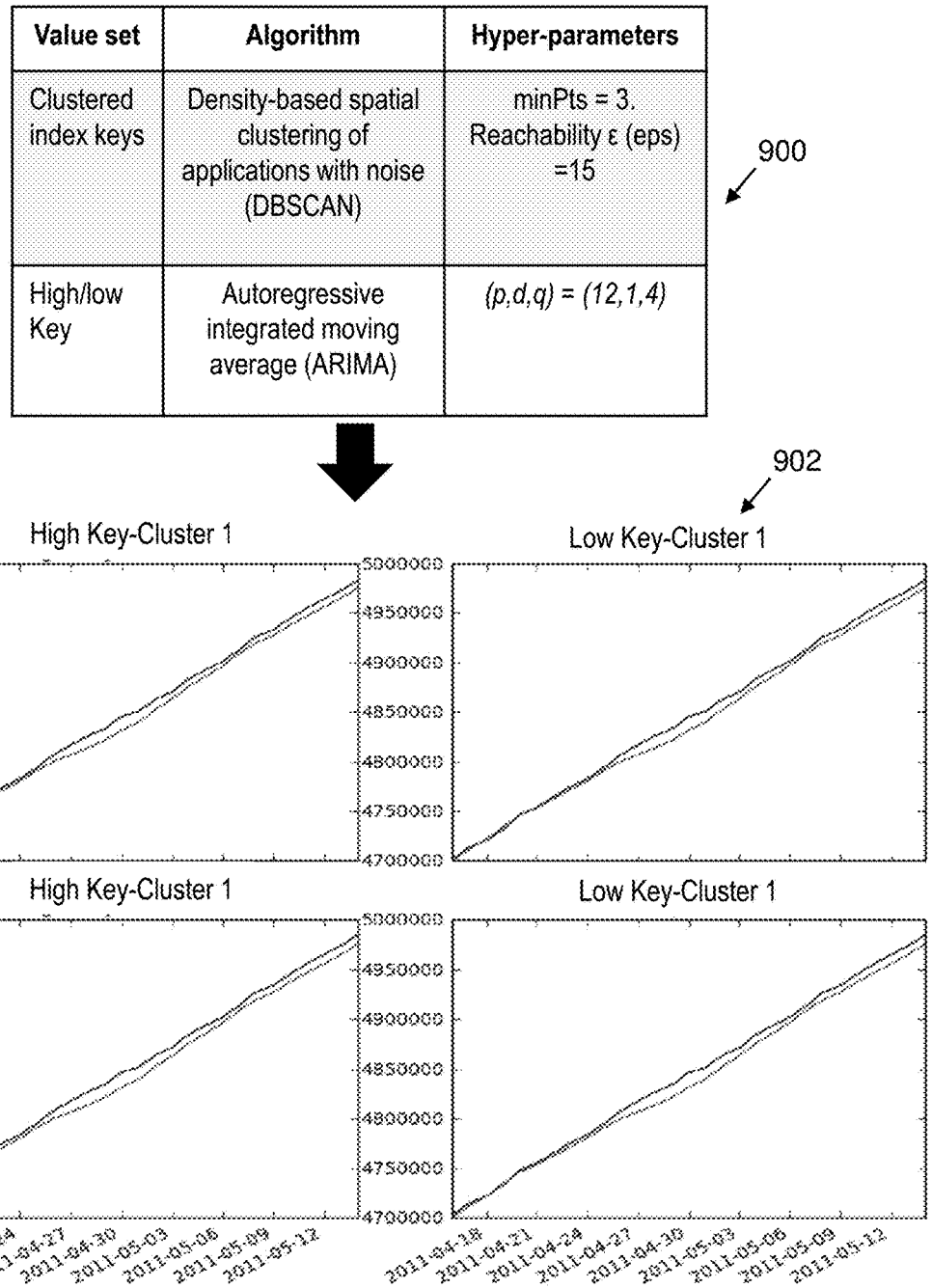
FIG. 9 illustrates the use of a machine learning algorithm to predict key ranges according to embodiments of the disclosure.

FIG. 9 illustrates the use of a ML algorithm for predicting key ranges according to embodiments of the disclosure. In embodiments, the insert prediction module 421 of FIG. 4 processes historic transaction data of the relational database 402 at 900 to generate an output represented by tables 902. In embodiments, the insert prediction module 421 utilizes a density cluster algorithm to group daily index keys of the historic transaction data into clusters. In implementations, the relational database 402 utilizes a density-based spatial clustering of applications with noise (DBSCAN) algorithm, which is a density-based clustering non-parametric algorithm. DBSCAN requires two parameters: the distance required to calculate direct density reachability ε (eps), and the minimum number of points required to form a dense region (minPts). In one example, minPts=3 and ε (eps)=15.

In embodiments, the insert prediction module 421 also utilizes an autoregressive integrated moving average (ARIMA) algorithm to determine high and low keys of each cluster for each day. Non-seasonal ARIMA models are generally denoted ARIMA(p,d,q) where parameters p, d, and q are non-negative integers, p is the order (number of time lags) of the autoregressive model, d is the degree of differencing (the number of times the data have had past values subtracted), and q is the order of the moving-average model. In one example, (p, d, q)=(12, 1, 4). Based on the high and low keys for each day, the training server 404 can predict future record insertion activity/key ranges for the relational database 402 at issue.

Figure 10:
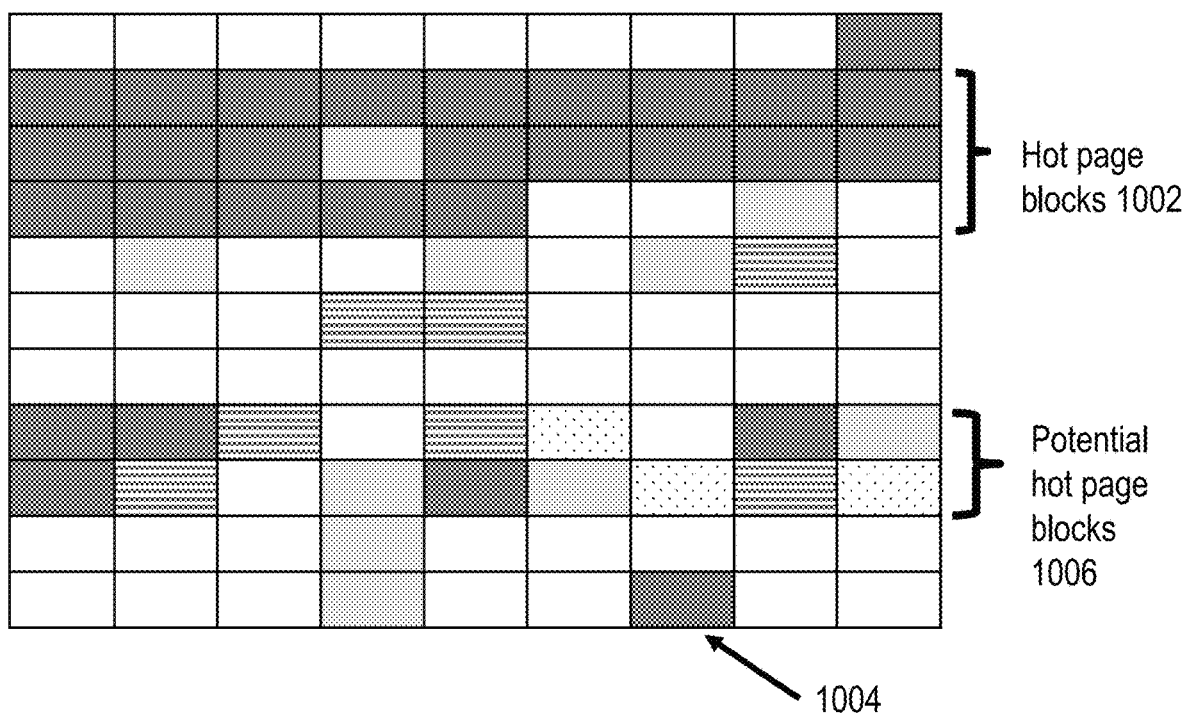
FIG. 10 illustrates an exemplary table space including hot page blocks and potential hot page blocks according to embodiments of the disclosure.

FIG. 10 illustrates an exemplary table space 1000 of a relational database 402 including hot page blocks 1002 comprised of hot pages 1004 and potential or predicted blocks of hot pages (hot page blocks) 1006 according to embodiments of the disclosure. In implementations, the insert prediction module 421 of the training server 404 utilizes the DBSCAN algorithm to detect existing hotspots and predict future hotspots based on free storage space and transaction history data for a page of a table.

Figure 11:
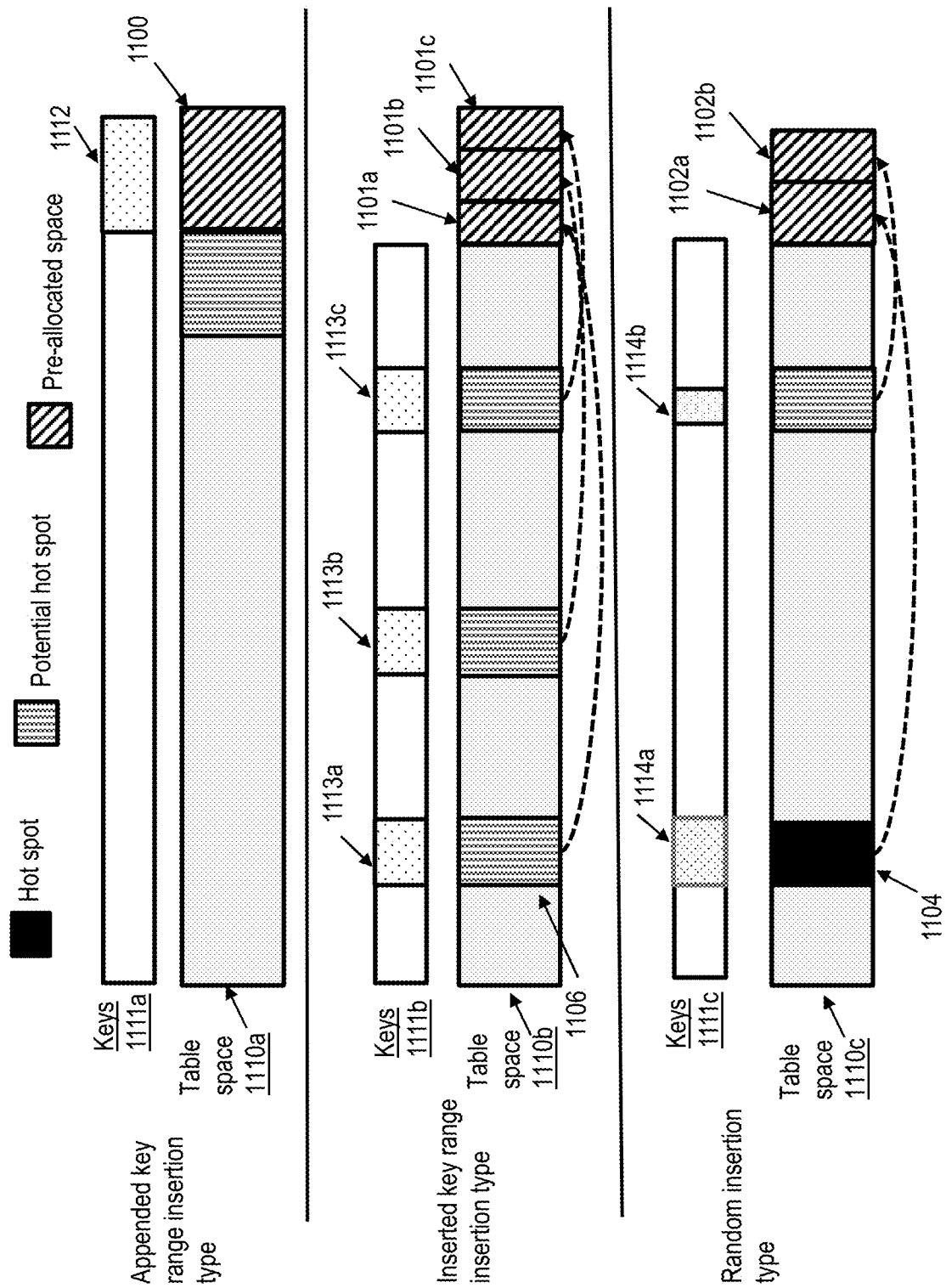
FIG. 11 is a diagram illustrating differences between exemplary record insertions utilizing conventional methods and exemplary record insertions utilizing pre-allocated space according to embodiments of the disclosure.

FIG. 11 is a diagram illustrating differences between exemplary record insertions utilizing conventional methods and exemplary record insertions utilizing pre-allocated space according to embodiments of the disclosure. In implementations, the space allocation module 422 of FIG. 4 pre-allocates space 1100, 1101*a*-1101*c* and 1102*a*-1102*b* for anticipated future record insertions based on existing hotspots (e.g., 1104) and predicted hotspots (e.g., 1106) determined by the insert prediction module 421. In the exemplary table space 1110*a*, records 1112 associated with a key range 1111*a* are appended to an end of the table space in accordance with an appended key range insertion type. In the exemplary table space 1110*b*, records 1113*a*, 1113*b*, 1113*c* are associated with a key range 1111*b* and are inserted in separate open spaces of the table space 1110*b* in accordance with an inserted key range insertion type. In the exemplary table space 1110*c*, records 1114*a* and 1114*b* are associated with a key range 1111*c* and are inserted in separate open spaces of the table space 1110*c* in accordance with a random insertion type. Instead of inserting the respective records 1113*a*-1113*c* and 1114*a*-1114*b* in separate spaces of the respective table spaces 1110*b* and 1110*c* according to existing insertion methods, embodiments of the disclosure result in the records being inserted into the respective pre-allocated spaces 1101*a*-1101*c* and 1102*a*-1102*b* (as illustrated by the dashed arrows). Accordingly, embodiments of the disclosure maintain inserted rows/records in a clustered order (sequential numeric order by key values), enabling quicker retrieval of the records by the relational database 402.

Figure 12:
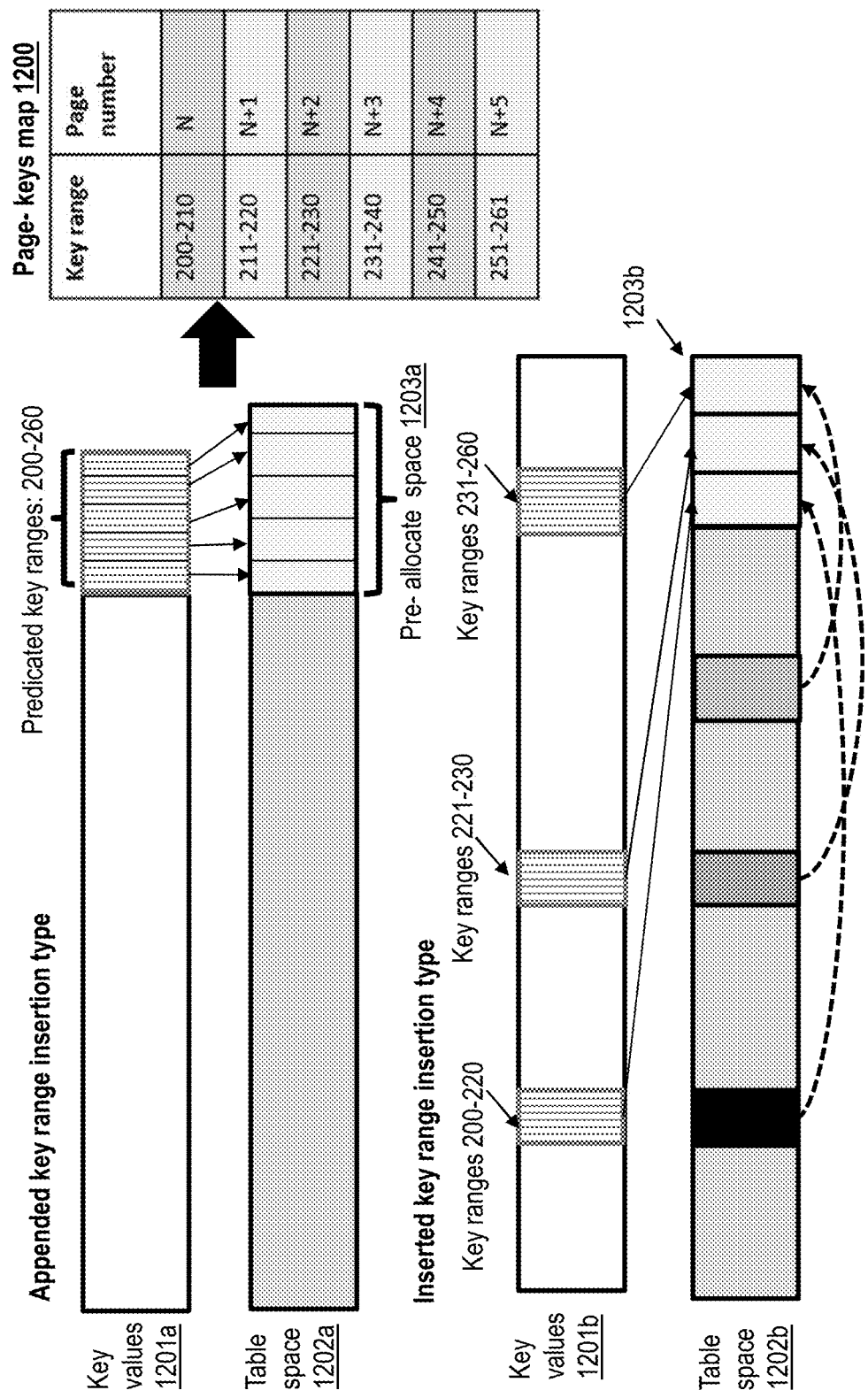
FIG. 12 is a diagram illustrating record insertions utilizing a page-keys map according to embodiments of the present disclosure.

FIG. 12 is a diagram illustrating record insertions utilizing a page-keys map according to embodiments of the present disclosure. An exemplary page-keys map 1200 is shown including key ranges and associated page numbers. FIG. 12 depicts, for an appended key range insertion type, exemplary key values 1201*a* included predicted key ranges 200-260, and an associated table space 1202*a* have pre-allocated space 1203*a*. FIG. 12 also depicts, for an inserted key range insertion type, exemplary key values 1201*a* included predicted key ranges 200-260, and an associated table space 1202*b* have pre-allocated space 1203*b*. Instead of storing the records at different dispersed spaces within the table space 1202*b*, the records are stored in the pre-allocated space 1203*b* (as illustrated by the dashed arrows).

Figure 13:
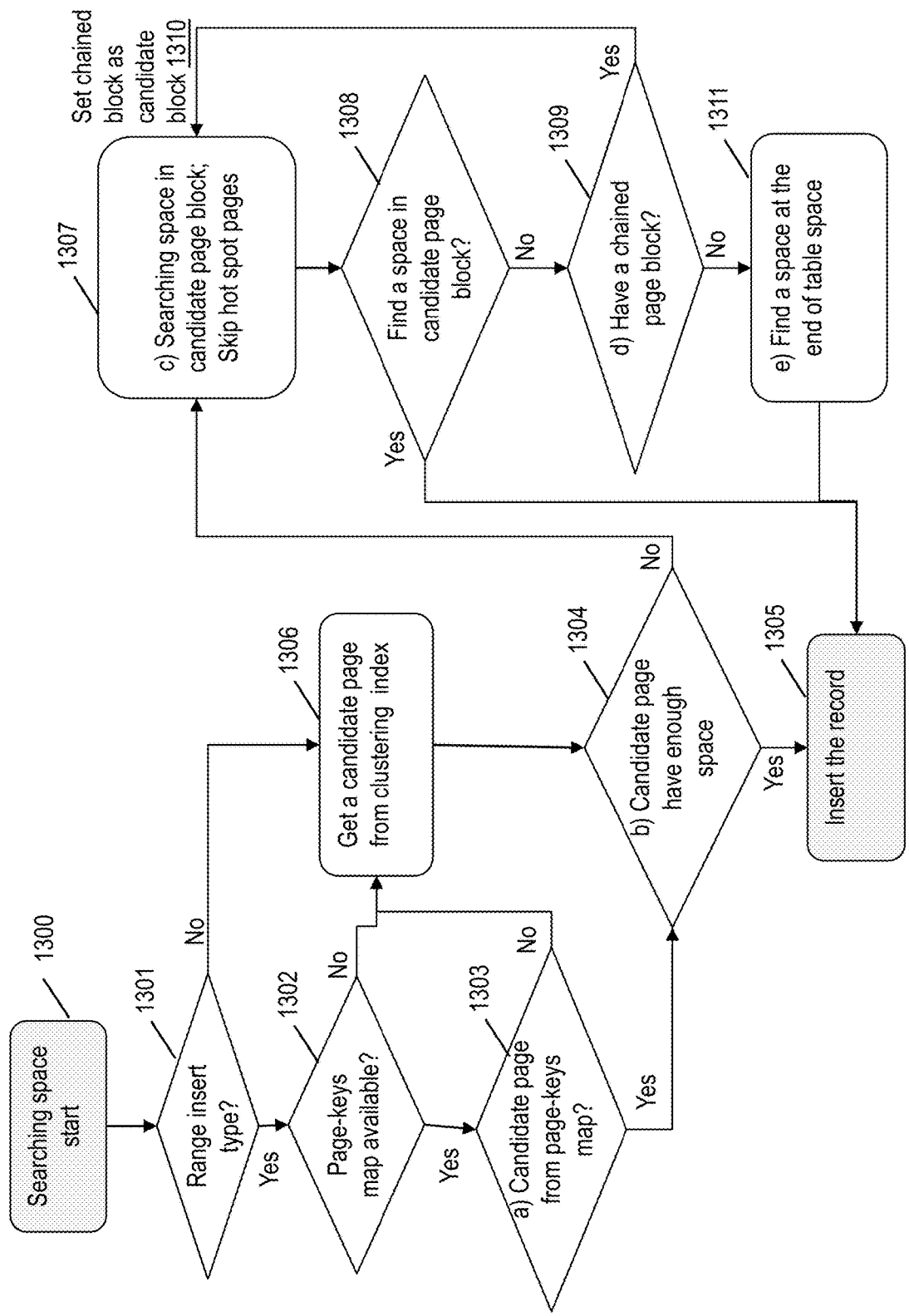
FIG. 13 is a flow diagram of record insertion operations according to embodiments of the present disclosure.

FIG. 13 is a flow diagram of record insertion operations according to embodiments of the present disclosure. In embodiments, a relational database 402 receives a request to insert a record (e.g., from a user device 406), and initiates a search for available storage space within the relational database 402 in response to the request at 1300. At 1301, the relational database 402 determines if the request to insert the record is a key range insertion type. If the insertion is a key range insertion type, the relational database 402 determines if there is an existing page-keys map (e.g., 423) at 1302. In implementations, the relational database 402 determines if a page-keys map is stored at the relational database 402 (e.g., previously received from the training server 402), or the relational database 402 communicates with the training server 404 to determine if the training server 404 has a page-keys map available. At 1303, if the page-keys map is available at 1302, the relational database 402 determines if a candidate page (a page in which to insert the data) is available based on the page-keys map. At 1304, if the relational database 402 determines at 1303 that there is a candidate page available for storing data based on the page-keys map, then the relational database 402 determines if the candidate page has enough available storage space for the requested data insertion. At 1305, if the relational database 402 determines that there is enough available storage space at 1304, then the relational database 402 inserts the record in the available space. Thus, in implementations, the insert algorithm of FIG. 13 enables the relational database 402 to find the candidate page directly utilizing the page-keys map, instead of search free space in a table to find a candidate page.

Still referring to FIG. 13, if the relational database 402 determines at 1301 that the request to insert the record is not a key range insertion type, then the relational database 402 obtains a candidate page from a clustering index (e.g., 412) of the relational database 402 at 1306, and moves on to operation 1304. Likewise, if the relational dataset 402 determines that a page-keys map is not available at operation 1302, then the relational database 402 obtains a candidate page from the clustering index of the relational database 402 at 1306, and moves on to operation 1304.

Referring back to operation 1304 of FIG. 13, if the relational database 402 determines that a candidate page does not have enough space for the requested record insertion, the relational database 402 moves to operation 1307. At 1307, the relational database 402 starts a search for available space in a candidate page block, wherein hotspot pages are skipped. At 1308, the relational database 402 determines if there is space for the record insertion in an available candidate page block (a block of pages). At 1309, if no space is available at 1308, then the relational database 402 determines at 1309 if a chained page block is available. At 1309, if the relational database 402 determines that a chained page block is available, the relational database sets the chained block as an available candidate block at 1310, and the relational database 402 determines if there is space in the chained block at 1308.

Operations 1308-1310 may repeat until the relational database 402 identifies a candidate page block with space for the requested record insertion according to operation 1308, and thereafter inserts the record into the available space in the candidate page block according to 1305. However, if the relational database 402 determines at 1309 that no chained page block is available, then the relational database 402 finds space at an end of a table at 1311 and proceeds to insert the record into the available space at the end of the table according to operation 1305.

Figure 14:
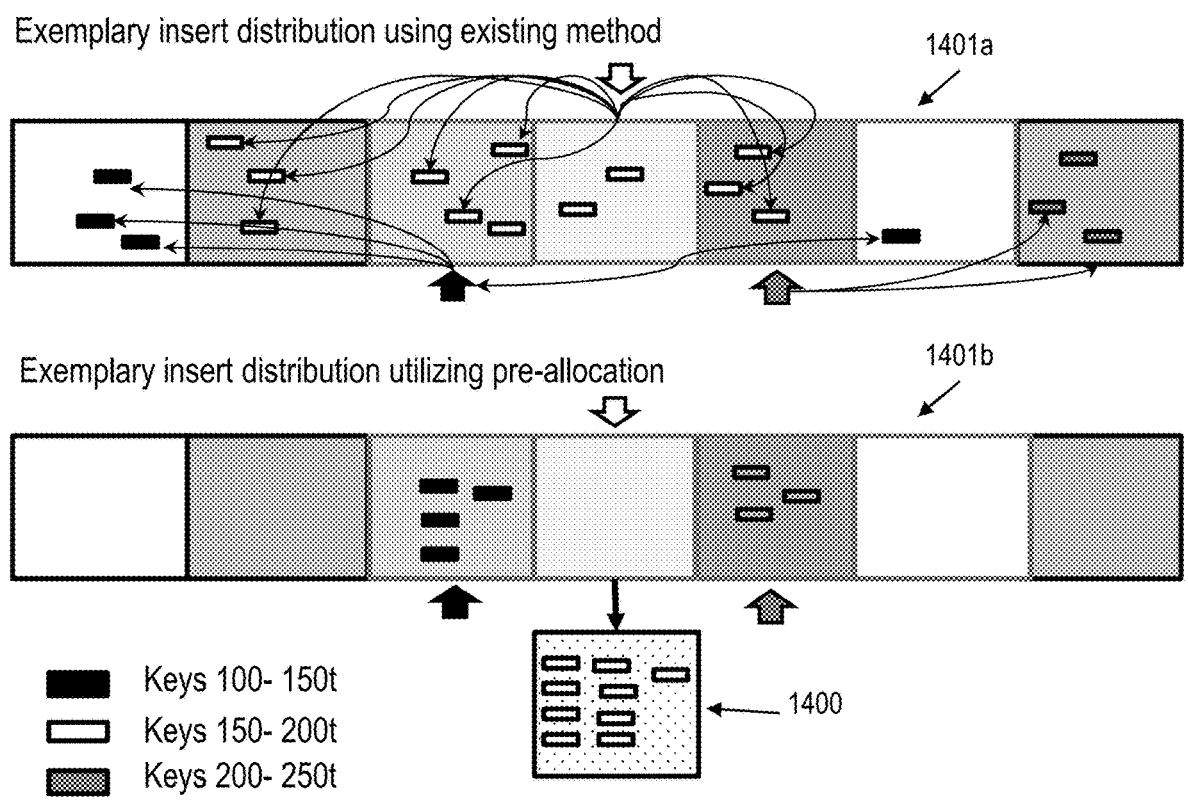
FIG. 14 is a diagram comparing record insertion results of existing methods versus record insertion results in accordance with embodiments of the present disclosure.

FIG. 14 is a diagram comparing exemplary record insertion results of existing methods versus exemplary record insertion results in accordance with embodiments of the present disclosure. As depicted in FIG. 14, a range of keys (e.g., keys 150-200) are inserted into a pre-allocated page space (e.g., space 1400) of pages 1401*b* in a clustered manner in accordance with methods of the present disclosure, as opposed to spread out between multiple pages 1401*a* of a table in accordance with existing record insertion techniques.

FIG. 15 is a diagram comparing exemplary record insertion results by page for existing methods versus exemplary record insertions results utilizing a page-keys map in accordance with embodiments of the present disclosure. As illustrated in FIG. 15, a first set of exemplary insertion results for a range of keys between 200 and 220 is depicted at 1500*a*, wherein records associated the keys 200-220 are inserted in pages 10-15 of a table using existing insertion methods, and wherein the records are inserted at a particular time period, but not necessarily in numeric order by the key value. A second set of exemplary insertion results for the key range 200-250 is depicted at 1500*b*, wherein records associated with keys 200-220 are inserted in pages 10-15 in clusters based on the page-keys map 1502, such that the keys are stored in clustered groups within the pages 10-15 for easy retrieval by the relational database 402.

Based on the above, it can be understood that embodiments of the disclosure can improve insert performance of a relational database 402 at a table side of the process by utilizing ML to dynamically predict insert type, insert key range, and predict and detect hotspots. Implementations of the disclosure pre-allocated pages and pre-calculate candidate pages based on the predicted insert key range, not an insert order. Based on the ML output, implementations of the disclosure improve a record insert algorithm to dynamically adapt the insert pattern and avoid hotspots from occurring by utilizing pre-allocated space and pre-calculated candidate pages.

In embodiments, a service provider could offer to perform the processes described herein. In this case, the service provider can create, maintain, deploy, support, etc., the computer infrastructure that performs the process operations of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
obtaining, by a computing device, database transaction data including data regarding record insertions in a table of a relational database, wherein each record of the record insertions is associated with a key value;
identifying, by the computing device, a type of each of the record insertions as either a random insertion type or a key range insertion type based on the database transaction data, wherein the random insertion type comprises records associated with respective key values inserted in a random order, and the key range insert type comprises records associated with a range of key values inserted within a certain time period;
predicting, by the computing device, a new range of key values associated with future record insertions based on the type of each of the record insertions; and
pre-allocating, by the computing device, page space in one or more pages of the relational database for the future record insertions.

2. The method of claim 1, further comprising:
detecting, by the computing device, one or more existing hotspots in the table based on the transaction data, wherein the hotspots comprise one or more pages incurring insert competition from multiple concurrent inserting processes meeting a threshold value; and
predicting, by the computing device, future instances of hotspots based on available free space in the table and a density-based spatial clustering of applications with noise (DBSCAN) analysis of the transaction data.

3. The method of claim 1, further comprising generating, by the computing device, a page-keys map associating the new range of key values with a respective page number and/or rows of the one or more pages.

4. The method of claim 1, wherein the pre-allocating page space comprises, for the future record insertions of the random insert type, pre-allocating an additional page space as a hotspot page block and chaining pages of the hotspot page block together.

5. The method of claim 1, wherein the predicting the new range of key values associated with the future record insertions comprises:
performing a density-based spatial clustering of applications with noise (DBSCAN) analysis of the data regarding record insertions to generate a daily clustering series of data grouping daily index keys of the database transaction data into clusters;
performing an autoregressive integrated moving average (ARIMA) analysis of the daily clustering series of data to determine high key values and low key values of each data cluster for each day in the daily clustering series of data; and
predicting a future high key value and low key value based on the determined high key values and low key values.

6. The method of claim 1, wherein the transaction data comprises at least one selected from the group consisting of: transaction log data, real-time statistics data, and trace information.

7. The method of claim 1, wherein the computing device includes software provided as a service in a cloud environment.

8. A computer program product comprising one or more computer readable storage media having program instructions collectively stored on the one or more computer readable storage media, the program instructions executable to cause a relational database to:
    initiate a search for available storage space in a table space of the relational database upon receipt of a request to insert data;
    determine whether the request to insert data comprises a key range insert type;
    in response to determining the request comprises a key range insert type, determine if there is an existing page-keys map, wherein the page-keys map associates pre-allocated spaces for future data insertions with page numbers of pages of the pre-allocated spaces;
    in response to determining there is an existing page-keys map, determine if the page-keys map indicates that a candidate page is available to store the data based on the page-keys map;
    in response to determining the candidate page is available, determine if there is enough storage space in the candidate page to store the data; and
    in response to determining there is enough storage pace in the candidate page to store the data, store the data in the candidate page based on the request to insert data.

9. The computer program of claim 8, wherein the storing the data in the candidate page results in the data being stored in cluster order according to key values associated with the data.

10. The computer program product of claim 8, the program instructions further executable to cause the transactional database to: in response to determining the request does not comprise a key range insert type, obtain the candidate page from a clustering index of the relational database.

11. The computer program product of claim 8, the program instructions further executable to cause the transactional database to:
    in response to determining there is not enough storage space in the candidate page to store the data, search for available storage space for the data in a candidate page block while skipping predetermined hotspot pages of the candidate page block;
    in response to determining there is no available storage space for the data in a candidate page block, determine if a chained page block is available, wherein the chained page block comprises multiple pages linked together based on anticipated hotspots in the transactional database; and
    in response to determining the chained page block is available, inserting the data in the chained page block.

12. The computer program product of claim 11, the program instructions further executable to cause the transactional database to: in response to determining the chained page block is not available, inserting the data into an available space at an end of the table space.

13. The computer program product of claim 11, the program instructions further executable to cause the transactional database to: provide a remote training server with historic transaction data including data regarding record insertions in the table space of the relational database.

14. The computer program product of claim 13, the program instructions further executable to cause the transactional database to determine a chained page block based on information received from the remote training server, wherein the chained page block comprises multiple pages linked together based on anticipated hotspots in the transactional database.

15. A system comprising:
    a processor, one or more computer readable storage media, and program instructions collectively stored on the one or more computer readable storage media, the program instructions executable to:
    obtain database transaction data including data regarding record insertions in a table of a relational database, wherein each record of the record insertions is associated with a key value;
    identify a type of each of the record insertions as either a random insertion type or a key range insertion type based on the database transaction data, wherein the random insertion type comprises records associated with respective key values inserted in a random order, and the key range insert type comprises records associated with a range of key values inserted within a certain time period;
    predict a new range of key values associated with future record insertions based on the type of each of the record insertions; and
    pre-allocate page space in one or more pages of the relational database for the future record insertions.

16. The system of claim 15, wherein the program instructions are further executable to:
    detect existing hotspots in the table based on the transaction data; and
    predict future instances of hotspots based on available free space in the table and a density-based spatial clustering of applications with noise (DBSCAN) analysis of the transaction data.

17. The system of claim 15, wherein the program instructions are further executable to generate a page-keys map associating the new range of key values with a respective page number and/or rows of the one or more pages.

18. The system of claim 15, wherein the pre-allocating page space comprises, for future record insertions of the random insert type, pre-allocating an additional page space as a hotspot page block and chaining pages of the hotspot page block together.

19. The system of claim 15, wherein the predicting the new range of key values associated with the future record insertions comprises:
    performing a density-based spatial clustering of applications with noise (DBSCAN) analysis of the data regarding record insertions to generate a daily clustering series of data;
    performing an autoregressive integrated moving average (ARIMA) analysis of the daily clustering series of data to determine high key values and low key values of each data cluster in the daily clustering series of data; and
    predicting a future high key value and low key value based on the determined high key values and low key values.

20. The system of claim 15, wherein the transaction data comprises at least one selected from the group consisting of: transaction log data, real-time statistics data, and trace information.

* * * * *